June 23, 1970 R. A. HERNDON 3,517,179

ARITHMETIC CIRCUITS FOR DIVISION AND SQUARE ROOT EXTRACTION
WITH FIELD EFFECT TRANSISTOR IN FEEDBACK NETWORK
OF AMPLIFIER

Filed June 28, 1968

*INVENTOR.*
RICHARD A. HERNDON

*BY* G. Donald Weber Jr.

ATTORNEY.

United States Patent Office 3,517,179

Patented June 23, 1970

3,517,179

ARITHMETIC CIRCUITS FOR DIVISION AND SQUARE ROOT EXTRACTION WITH FIELD EFFECT TRANSISTOR IN FEEDBACK NETWORK OF AMPLIFIER

Richard A. Herndon, Englewood, Colo., assignor to Honeywell Inc., Minneapolis, Minn., a corporation of Delaware Filed June 28, 1968, Ser. No. 741,126

Int. Cl. C06g *7/16, 7/20;* H03f *3/11*

U.S. Cl. 235—196 5 Claims

ABSTRACT OF THE DISCLOSURE

Arithmetic circuits including standard operational amplifiers are provided to effect division and square root extraction. A field-effect transistor (FET) with typical FET characteristics is connected in the feedback network of the amplifier in order to effect the enumerated arithmetic functions.

Cross reference is made to the copending application entitled Arithmetic Circuits, by R. Herndon (the instant inventor), filed on June 28, 1968 and bearing Ser. No. 741,125, and assigned to a common assignee. The cross referenced application relates to arithmetic circuits wherein an FET is used as an active element. However, in the cross referenced application, the control element (FET) is connected in the input circuit, not as the feedback network, of an operational amplifier.

There are many applications of arithmetic circuits in the electronic industry. These circuits are frequently used in computing systems of many types. In addition, many circuits and circuit configurations are known to effect arithmetic functions.

The subject invention uses operational amplifiers which are known in the art. More particularly, the amplifiers may be constructed of integrated circuit components such as a Fairchild 709C amplifier. In addition, typical field-effect transistors (FET) are utilized in conjunction with the amplifiers. However, the interconnections produce arithmetic components which are relatively simple in configuration and exhibit a high degree of reliability. In the square root circuit, the input is applied through an impedance device while the feedback network is an FET. The division circuit uses a modified version of the square root circuit configuration plus an additional amplifier circuit to provide a predetermined input to the FET wherein the division circuit is produced.

Consequently, one object of this invention is to provide arithmetic circuits.

Another object of this invention is to provide arithmetic circuits utilizing integrated circuits and field-effect transistors.

Another object of this invention is to provide a plurality of arithmetic circuits having a small number of components arranged in an uncomplicated configuration.

Figure 1:
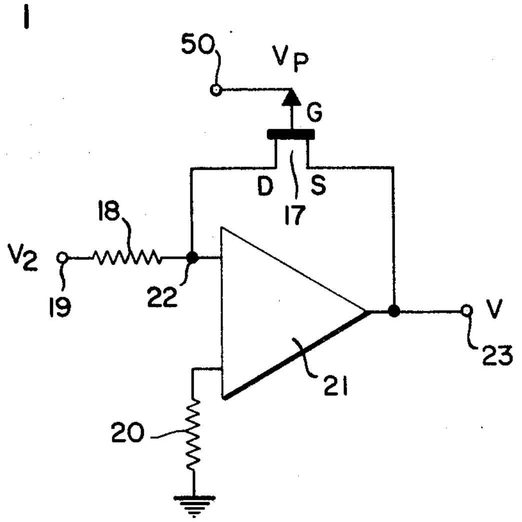
Figure 2:
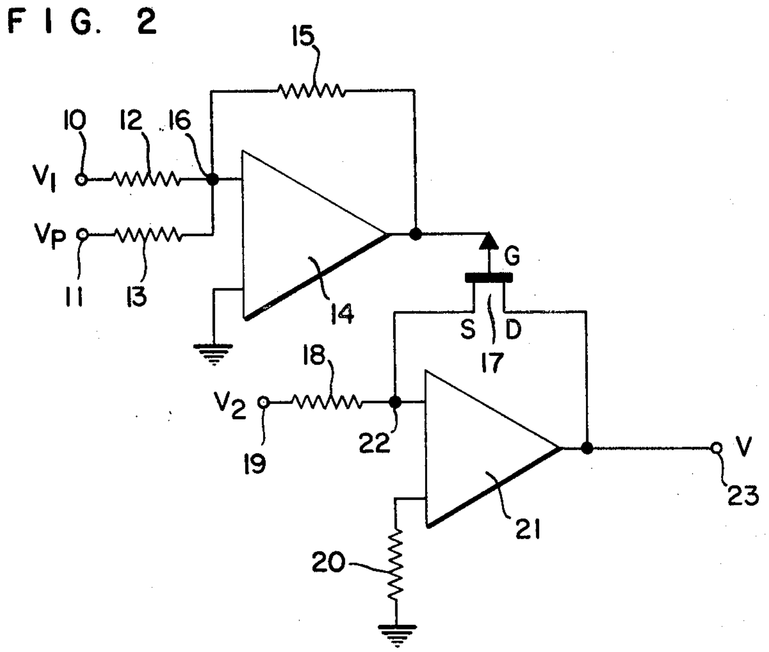

These and other objects and advantages will become more readily apparent when the following description is read in conjunction with the attached drawings, in which:

FIG. 1 is a schematic diagram of a preferred embodiment of the square root extraction circuit; and FIG. 2 is a schematic diagram of a preferred embodiment of the division circuit.

In this description, similar elements in the several figures bear similar reference numerals.

Referring to FIG. 1, there is shown a square root extraction circuit. Input terminal 50 is connected to a suitable source to supply the potential $V_p$ to the gate electrode of FET 17. The drain electrode of transistor 17 is connected to summing junction 22 which is one input of amplifier 21. Junction 22 is connected, via resistor 18, to a further input terminal 19. Input terminal 19 receives an input signal $V_2$. A further input terminal of amplifier 21 is connected to ground, or other suitable reference potential, via resistor 20. The output of amplifier 21 is connected to the source electrode of FET 17 and to output terminal 23. Output voltage $V_0$ is detected at terminal 23.

Referring now to FIG. 2, input terminals 10 and 11 receive, respectively, input signals $V_1$ and $-V_p$. Terminals 10 and 11 are connected to resistors 12 and 13, respectively. The other ends of resistors 12 and 13 are connected to summing junction 16 which is one input of operational amplifier 14. Another input of amplifier 14 is connected to ground or other suitable reference potential. The output of amplifier 14 is connected, via feedback resistor 15, to summing junction 16.

The output of amplifier 14 is further connected to the gate electrode of FET 17. The source electrode of transistor 17 is connected to summing junction 22 which is one input of amplifier 21. Junction 22 is connected, via resistor 18, to a further input terminal 19. Input terminal 19 receives a signal $V_2$. A further input of amplifier 21 is connected to ground, or other suitable reference potential, via resistor 20. The output of amplifier 21 is connected to the drain electrode of FET 17 and to output terminal 23 where the output signal $V_0$ is detected.

Initially, the operation of the square root circuit shown in FIG. 1 is described. This circuit performs the function $$V_0=\sqrt{|V_2|}$$

The transfer function of the circuit is $$V_0=-\frac{V_2R_{DS}}{R_{IN}}$$

In this case, the voltages are defined, while $R_{DS}$ is the drain-to-source resistance of transistor 17 which is a function of the voltage between the gate and source electrodes. The value of resistor $R_{IN}$ is the value of resistor 18.

In addition, the drain-source resistance $R_{DS}$ is defined as $$R_{DS}=\frac{R_K}{V_P-V_{GS}}$$

where $R_K$ is a constant for the field-effect transistor and $V_P$ is the pinch-off voltage for the field-effect transistor. Since (as is known) $V_{GS}=V_p-V_0$, substitution in the previous equation produces $$R_{DS}=\frac{R_K}{V_p-(V_P-V_0)}$$

If $V_P$ is set equal to $V_p$, this equation becomes $$R_{DS}=\frac{R_K}{V_0}$$

Substituting this equation into the initial equation produces $$V_0=\frac{-V_2R_K}{V_0}\frac{1}{R_{IN}}$$

Multiplying and collecting terms produces $$V_0^2=\frac{-V_2R_K}{R_{IN}} \text{ or } V_0=\sqrt{\frac{-V_2R_K}{R_{IN}}}$$

with a negative value of $V_2$ and setting $R_K$ equal to $R_{IN}$, the circuit equation becomes $V_0=\sqrt{|V_2|}$. Thus, the circuit shown in FIG. 1 is a square root extraction circuit.

By supplying a predetermined input to the gate electrode of FET 17, the division circuit shown in FIG. 2 is provided. Specifically, the input is supplied by amplifier 14, connected as shown. The input signals $V_1$ and $-V_p$ are supplied to terminals 10 and 11. These terminals are connected to summing junction 16 via resistors 12 and 13, respectively. The signals $V_1$ and $-V_p$ are summed at junction 16 and applied to amplifier 14. The amplifier 14, when connected in the configuration shown, produces an output signal which is defined as $K(V_p-V_1)$. Referring to the description supra, the transfer function for the circuit shown in FIG. 2 is $$V_0=\frac{V_2}{V_1}$$

Moreover, as noted supra, $$V_0=\frac{V_2 R_{DS}}{R_{IN}}$$

These functions are defined supra. However, the function $R_{DS}$ may be further defined as $$R_{DS}=\frac{V_P}{2I_{DSS}\left(\frac{V_{GS}}{V_p}-1\right)}$$

wherein $I_{DSS}$ equals the drain current when $V_{GS}=0$, $V_{GS}$ may be defined as $V_{GS}=V_p-V_1$. Therefore, $R_{DS}$ approximates $$\frac{1}{V_p-V_{GS}}$$

which equals $$\frac{1}{V_p}-(V_p-V_1)$$

Setting $V_p=V_p$, i.e. the pinch-off voltage of the FET, produces $$R_{DS}\cong\frac{1}{V_1}$$

Substituting in the equation supra there is, obtained $$V_0=\frac{-V_2}{V_1 R_{IN}}$$

As noted supra, the constant $R_K$ relative to the amplifier 21, effectively, normalizes the equation wherein the output for the overall network becomes $$V_0\cong\frac{V_2}{V_1}$$

Thus, there has been shown and described arithmetic circuits using only operational amplifiers of the integrated circuitry type and field-effect transistors. By connecting the field-effect transistor in the feedback path of an operational amplifier, a desirable arithmetic function is achieved. Additionally, by supplying a further operational amplifier which controls the input signals supplied to the field-effect transistor, other arithmetic functions are achieved by substantially similar circuitry. These circuits are extremely simple in configuration and are extremely reliable. By proper design of the circuit and parameters thereof, certain proportional values or constants may be eliminated or normalized.

It is understood that those skilled in the art may conceive modifications of these circuits. However, so long as the modifications and/or changes fall within the inventive concepts noted and described supra, these modifications are meant to be included in this description.

The embodiments of the invention in which an exclusive property or privilege is claimed are defined as follows:

1. An arithmetic circuit comprising
- amplifier means,
- input means connected to an input terminal of said amplifier means,
- feedback means connected from the output terminal of said amplifier means to said input terminal of said amplifier means associated with said input means,
- said feedback means including an active element comprising a field-effect transistor having drain, source, and gate electrodes, the drain and source electrodes of said field-effect transistor being connected in series between said output terminal and said input terminal of said amplifier means, means for supplying a selectively variable continuous control potential to said gate electrode of said field-effect transistor, and
- means for supplying input signals to said input means.

2. The arithmetic circuit recited in claim 1 wherein said means supplying control potential comprises a source of substantially fixed voltage, said source of fixed voltage exhibiting a voltage amplitude substantially equal to the pinch-off voltage of said field effect transistor, said arithmetic circuit thereby producing an output signal proportional to the square root of the signal produced by said input means.

3. The arithmetic circuit recited in claim 1 wherein said means supplying control potentials includes second input means including a second amplifier means, said second amplifier means having at least one input source connected thereto, said second amplifier means being arranged to operate on the signal supplied thereto by each input source and connected to supply a signal to said gate electrode of said field-effect transistor,
- the source electrode of said field effect transistor being connected to said input terminal and the drain electrodes connected to said output terminal,
- said arithmetic circuit thereby producing an output signal proportional to the quotient of the signal supplied to the input of said second amplifier and the signal produced by said input means.

4. The arithmetic circuit recited in claim 1 wherein said input means comprises resistance means which is a function of the parameters of said active element in said feedback means.

5. The arithmetic circuit recited in claim 3 wherein each of said amplifiers is substantially identical.

References Cited

UNITED STATES PATENTS

| | | | |
|---|---|---|---|
| 3,215,824 | 11/1965 | Alexander et al. | 235—194 X |
| 3,257,631 | 6/1966 | Evans | 307—304 X |
| 3,300,585 | 1/1967 | Reedyr et al. | 330—38 X |
| 3,368,157 | 2/1968 | Fumea et al. | 330—38 X |
| 3,378,779 | 4/1968 | Priddy | 330—38 X |
| 3,408,371 | 10/1968 | Wilson | 307—304 X |

MALCOLM A. MORRISON, Primary Examiner

J. F. RUGGIERO, Assistant Examiner

U.S. Cl. X.R.

235—193.5; 307—304; 330—38